United States Patent [19]

Leary

[11] Patent Number: 4,571,481

[45] Date of Patent: * Feb. 18, 1986

[54] METHOD AND APPARATUS FOR ELECTRICALLY HEATING DIESEL FUEL

[75] Inventor: David F. Leary, Woodside, Calif.

[73] Assignee: Raychem Corporation, Menlo Park, Calif.

[*] Notice: The portion of the term of this patent subsequent to Jul. 16, 2002 has been disclaimed.

[21] Appl. No.: 606,033

[22] Filed: May 1, 1984

Related U.S. Application Data

[63] Continuation-in-part of Ser. No. 474,390, Mar. 11, 1983, Pat. No. 4,529,866.

[51] Int. Cl.$^4$ .................. F02M 31/12; F24H 1/10; H05B 3/14
[52] U.S. Cl. .................... 219/205; 123/549; 123/557; 210/184; 210/186; 219/299; 219/305; 219/307; 219/308; 219/319; 219/338; 219/505; 219/548; 338/22 R; 431/208
[58] Field of Search ........ 219/205, 206, 207, 296–309, 219/504, 505, 319, 338; 123/549, 557; 210/184, 185, 186; 338/22 R; 431/208

[56] References Cited

U.S. PATENT DOCUMENTS

| | | | |
|---|---|---|---|
| 1,746,522 | 2/1930 | Carleton | 219/307 |
| 3,099,737 | 7/1963 | Naxon | 219/307 |
| 4,372,260 | 2/1983 | Baker | 123/557 X |
| 4,372,279 | 2/1983 | Parks | 219/205 X |
| 4,387,691 | 6/1983 | Marcoux et al. | 123/557 |
| 4,398,084 | 8/1983 | Walty | 219/528 |
| 4,406,785 | 9/1983 | Siefer | 219/205 X |

FOREIGN PATENT DOCUMENTS

| | | | |
|---|---|---|---|
| 051936 | 5/1982 | European Pat. Off. | |
| 74281 | 3/1983 | European Pat. Off. | |
| 101560 | 2/1984 | European Pat. Off. | |
| 1106005 | 5/1961 | Fed. Rep. of Germany | |
| 2459602 | 1/1981 | France | |
| 101971 | 11/1923 | Switzerland | 219/299 |
| 134546 | 10/1929 | Switzerland | 219/301 |
| 1086626 | 10/1967 | United Kingdom | 219/307 |
| 2100559 | 12/1982 | United Kingdom | |

Primary Examiner—A. Bartis
Attorney, Agent, or Firm—Stephen C. Kaufman; Timothy Richardson

[57] ABSTRACT

Apparatus and method for heating liquids, e.g. diesel fuel, by means of a conductive polymer heater which does not have an insulating jacket, so that there is direct physical contact between the liquid and electrically conductive parts of the heater. This results in improved heat transfer to the liquid. The unjacketed heater comprises a pair of elongate spaced electrodes embedded in an elongated strip of a conductive polymer, such as cross-linked polyvinylidene fluoride, which exhibits PTC behavior. The heater is positioned in a container through which diesel fuel to be heated flows from an entry port to an exit port. The exterior surface of the polymer strip is exposed and is directly contacted by the flowing diesel fuel.

9 Claims, 4 Drawing Figures

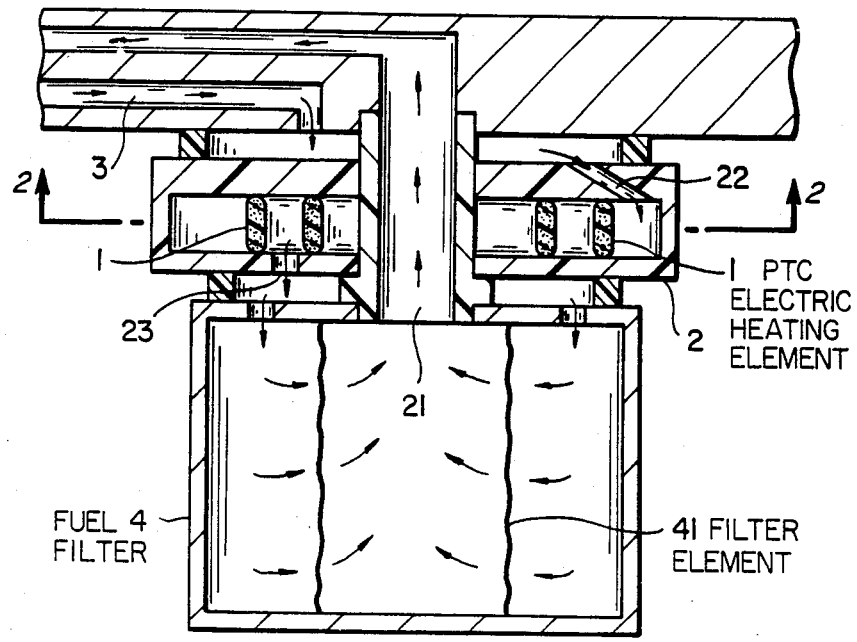
FIG_1
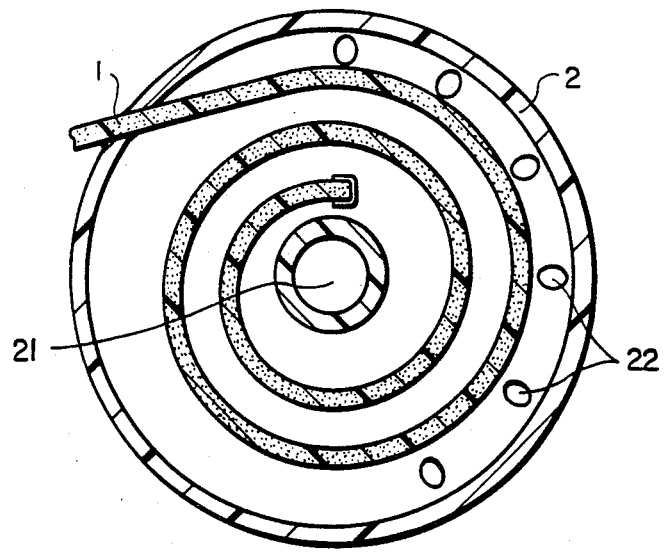
FIG_2

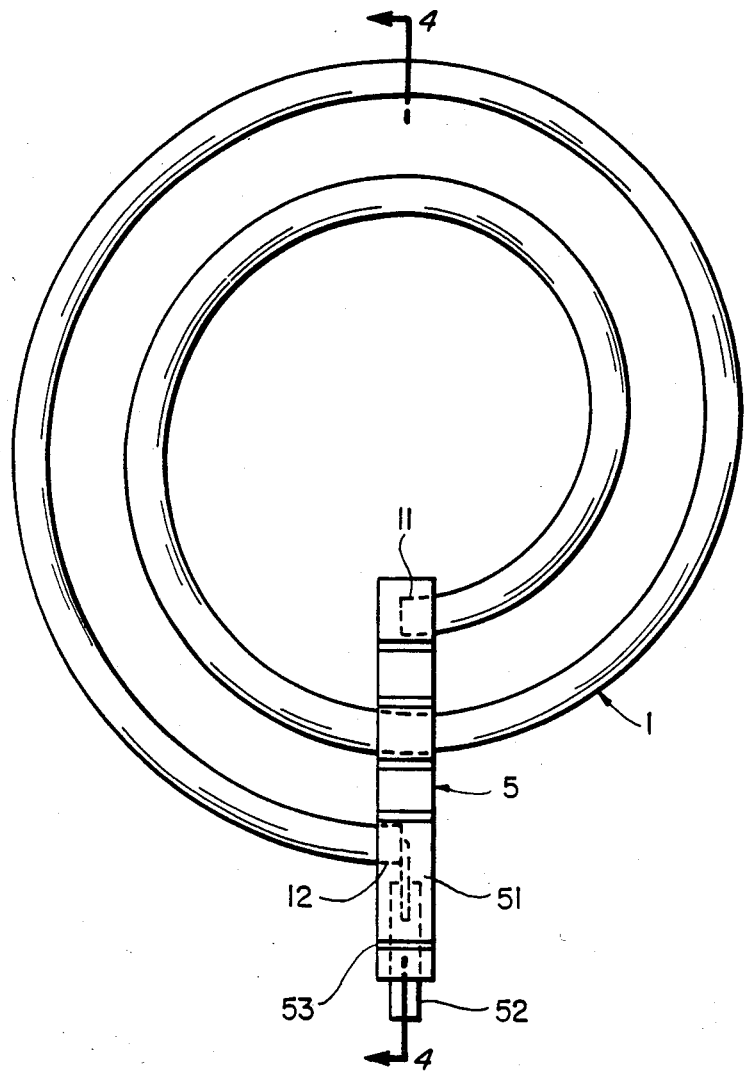
FIG_3
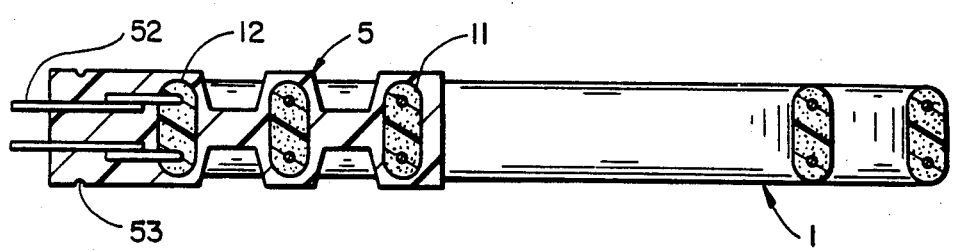
FIG_4

METHOD AND APPARATUS FOR ELECTRICALLY HEATING DIESEL FUEL

CROSS-REFERENCE TO RELATED APPLICATION

This application is a continuation-in-part of my copending application Ser. No. 474,390 filed Mar. 11, 1983, now U.S. Pat. No. 4,629,866, the disclosure of which is incorporated herein.

BACKGROUND OF THE INVENTION

1. Field of the Invention

This invention relates to the heating of liquids, especially diesel fuel, by means of conductive polymer heaters.

2. Introduction to the Invention

Conductive polymer heaters have proved to be particularly suitable for heating diesel fuel, for example prior to filtration in the fuel systems of diesel engines in vehicles, and in domestic heating systems. For disclosure of various methods of heating diesel fuel and other liquids, reference may be made for example to U.S. Pat. Nos. 2,669,299, 3,564,199, 3,935,901, 3,989,019, 4,091,265 and 4,372,279 and copending and commonly assigned U.S. Patent Application Ser. Nos. 273,525 now U.S. Pat. No. 4,398,084, 382,259, now abandoned and 423,589.

The disclosures of the above-mentioned patents and patent applications are incorporated herein by reference.

SUMMARY OF THE INVENTION

In the past, all conductive polymer heaters have been provided with an insulating polymeric jacket. We have now discovered that when such a heater is used to heat a liquid, greatly improved results can be obtained by using a heater which does not have an insulating jacket. Absence of the jacket greatly enhances the transfer of heat to the liquid and results in a surprising increase in the power output of the heater.

In one aspect, the invention provides an apparatus for heating a liquid, the apparatus comprising (1) a container having entry and exit ports for passing a liquid through the container; and
(2) an electrical heater which
   (i) is positioned within the container;
   (ii) comprises
      (a) a heating element composed of a conductive polymer composition, and
      (b) at least two electrodes which can be connected to a source of electrical power to cause current to pass through the heating element; and
   (iii) does not comprise an electrically insulating jacket, whereby liquid passing through the container is in direct physical contact with electrically conductive parts of the heater.

In another aspect, the invention provides a method of heating a liquid, which method comprises contacting the liquid with an electrical heater which comprises (a) at least two electrodes which are connected to a source of electrical power, and
(b) a conductive polymer heating element through which current passes between the electrodes, the liquid being in direct physical contact with electrically conductive parts of the heater.

In the method and apparatus of the invention, the heater is preferably a strip heater (e.g. a heater which comprises a pair of elongate metal electrodes embedded in an elongate element composed of a PTC conductive polymer). The heater can be placed axially within a conduit through which the liquid is passed. Alternatively the heater can be arranged in spaced-apart coils, e.g. a spiral coil; the liquid can flow through the coils or can follow an elongate curved path which follows the coils of the heater.

The invention is particularly useful for, and will chiefly be described by reference to, the heating of diesel fuel (and in particular #2 diesel fuel) just before it passes through the fuel filter of the fuel supply system of a diesel engine fitted to a wheeled or tracked vehicle. It will be understood, however, that the invention is useful for heating diesel fuels in other contexts and for heating other liquids whose resistivity is sufficiently high to ensure that any leakage currents are low enough not to cause danger or damage. We have found that removal of the insulating jacket increases the power output of the heater by a factor of at least 1.5, e.g. about 2 (for example from about 50 watts/ft to about 100 watts/ft), when heating diesel fuel.

BRIEF DESCRIPTION OF THE DRAWING

The invention is diagrammatically illustrated in the accompanying drawings, in which FIG. 1 is a cross-section through apparatus of the invention installed above a fuel filter;

FIG. 2 is a cross-section along the line 2—2 of FIG. 1;

FIG. 3 is a plan view of an assembly of the invention; and

FIG. 4 is a cross-section along line 4—4 of FIG. 3.

DETAILED DESCRIPTION OF THE INVENTION

Self-regulating heaters are preferred for use in this invention, especially such heaters comprising an element composed of a conductive polymer composition which exhibits PTC behavior and which may be cross-linked, for example a continuous elongate element having a pair of elongate electrodes embedded therein. The contact between the liquid and the heater must not of course result in unacceptable damage to the heater; for example, it remains highly desirable that the ends of the heater be sealed, so that the diesel fuel cannot penetrate between the electrodes and the conductive polymer). When using an unjacketed PTC conductive polymer heater to heat diesel fuel, it is preferred to use a cross-linked composition comprising a fluoropolymer, particular a polymer of vinylidene fluoride, especially a low deflect fluoropolymer, as disclosed in copending, commonly assigned U.S. Ser. No. 423,589, filed Sept. 27, 1982.

The heater can be arranged within a container in any way which results in satisfactory contact with the liquid. In one embodiment, the container comprises first and second parallel walls, with the heater sandwiched between the walls with the coils thereof lying in a plane. The heater can be arranged in a spiral coil, which is generally preferred, or in a serpentine coil with baffles within each coil to ensure the desired flow pattern. The container can contain one or more entry ports and one or more exit ports. It is preferred that the length of the elongate curved path followed by the liquid is at least 8 times, preferably at least 15 times, the straight line distance between the entry and exit ports.

The power supply used to power the heater can be of any kind appropriate to the heater, but for vehicular systems, the normal vehicle electrical supply, e.g. a 12 or 24 volt DC supply, is preferably employed.

For fitting to the fuel supply system of a vehicle, the heater can be fitted within the fuel conduit leading from the fuel tank to the filter, or in the top of the filter, or it can form part of a heating apparatus adapted to fit between the fuel filter and the inlet thereto. This will usually mean that the apparatus will be in the form of a flat container, for example round or square in shape, having the heater and the entry and exit ports in a peripheral portion thereof and having at its center a passageway for fuel which, having been heated in the container and having passed from the exit port(s) to the filter, is now being supplied to the engine. The passageway preferably has screw-threaded top and bottom portions for connection to the fuel system and the fuel filter.

Where a support member is used to maintain the heater in a coiled configuration, the support member must of course allow the fuel to flow around the heater in the desired way. The support is suitably composed of a polymeric dielectric material which is not damaged by the liquid being heated. Preferably the support contains the terminations of the heater electrodes to electrical leads or lugs suitable for connecting the heater to a power supply, and surrounds and seals the terminations. The far end of the heater can likewise be encapsulated in the support. Thus the support can be formed around the coiled heater, e.g. by injection molding or by pouring a curable liquid resin, e.g. an epoxy resin in a mold.

Alternatively the support comprises a chamber which contains the terminations of the heater electrodes to electrical leads or lugs suitable for connecting the heater to a power supply, and a mass of dielectric material which surrounds and seals the terminations. The far end of the heater can likewise be encapsulated in a mass of dielectric material contained within a chamber in the support.

Referring now to the drawing, FIGS. 1 and 2 show a PTC conductive polymer strip heater 1, which does not have an outer insulating jacket, arranged in the form of a spiral coil within a flat, round box 2 which has a central passageway 21. Fuel entry ports 22 are drilled in the top wall of the container so that diesel fuel which is pumped along line 3 enters the box around the outer periphery of the container and then flows in a spiral around the strip heater 1 until it reaches the fuel exit ports 23. The heated fuel then passes into conventional fuel filter 4, through filter element 41 and up through passageway 21 to the engine.

FIGS. 3 and 4 show an assembly of the invention comprising a PTC conductive polymer strip heater 1, which does not have an outer dielectric jacket, maintained in the form of a flat spiral coil by fixing the ends 11 and 12 of the heater in or on support member 5. Support member 5 has an end section 51 within which the connections between the conductors of the heater and spade lugs 52 are encapsulated, and which also has an O-ring groove 53 in its outer surface.

Especially when an assembly of the invention, e.g. as shown in FIGS. 3 and 4, is used, the container in which it is mounted can be an integral part of the fuel filter mount or a separate container which is secured to the fuel filter mount. The interior surface of the container can be shaped, or provided with deformable portions, so that there is no more than a small gap between the heater and the container walls, in order to ensure that a sufficient proportion of the liquid follows the desired elongate path.

I claim:

1. Apparatus for heating diesel fuel, the apparatus comprising:
   (1) a container having entry and exit ports for passing the diesel fuel through the container; and
   (2) an electrical heater which
      (i) is positioned within the container;
      (ii) comprises
         (a) an elongate unjacketed heating element composed of an electrically conductive polymer composition which exhibits PTC behavior, and
         (b) at least two electrodes which can be connected to a source of electrical power to cause current to pass through the heating element; and
      (iii) the exterior surface of the elongate heating element being exposed so that it is directly contactable by the diesel fuel passing through the container.

2. Apparatus according to claim 1 wherein the heater comprises a pair of elongate metal electrodes embedded in an elongate heating element composed of a conductive polymer which exhibits PTC behavior, the exterior surface of said elongate heating element being in direct physical contact with diesel fuel passing through the container.

3. Apparatus according to claim 2 wherein the conductive polymer is cross-linked.

4. Apparatus according to claim 2 wherein the conductive polymer comprises a fluorinated polymer.

5. Apparatus according to claim 4 wherein the polymer comprises cross-linked polyvinylidene fluoride.

6. Apparatus according to claim 2 which comprises mechanical connection means for removably securing the entry and exit ports of the container between a fuel feed and a fuel filter forming part of the fuel feed system for a diesel engine.

7. A method of heating diesel fuel which comprises contacting the diesel fuel with an unjacketed electrical heater which comprises
   (a) at least two electrodes which are connected to a source of electrical power, and
   (b) an electrically conductive polymer unjacketed heating element which exhibits PTC behavior through which current passes between the electrodes, the exterior surface of said heating element being exposed so that it is directly contacted by the diesel fuel; and
   (c) energizing the heating element through the electrodes to generate heat to heat the fuel.

8. A method according to claim 7 wherein the heater comprises a pair of elongate metal electrodes embedded in an elongate heating element composed of an electrically conductive polymer which exhibits PTC behavior, the exterior surface of said elongate heating element making direct physical contact with the diesel fuel.

9. A method according to claim 8 wherein the conductive polymer comprises cross-linked polyvinylidene fluoride.

* * * * *

UNITED STATES PATENT AND TRADEMARK OFFICE
CERTIFICATE OF CORRECTION

PATENT NO. : 4,571,481

DATED : February 18, 1986

INVENTOR(S) : David Frederick Leary

It is certified that error appears in the above-identified patent and that said Letters Patent are hereby corrected as shown below:

In the specification, col. 1, line 3, U.S. Pat. No. should read "4,529,866.

Signed and Sealed this

Twenty-fourth Day of June 1986

[SEAL]

Attest:

DONALD J. QUIGG

Attesting Officer   Commissioner of Patents and Trademarks